Jan. 5, 1943.　　　　R. ULLMAN ET AL　　　　2,307,248

MEASURING INSTRUMENT

Filed Dec. 20, 1939

INVENTOR
COLEMAN B. MOORE
ROY ULLMAN
BY
ATTORNEY

Patented Jan. 5, 1943

2,307,248

UNITED STATES PATENT OFFICE 2,307,248

MEASURING INSTRUMENT

Roy Ullman, Roslyn, and Coleman B. Moore, Carroll Park, Pa., assignors to The Brown Instrument Company, Philadelphia, Pa., a corporation of Pennsylvania Application December 20, 1939, Serial No. 310,138

5 Claims. (Cl. 74—96)

The object of the present invention is to provide a connecting link between the measuring and recording elements of a recording instrument. Prior to this invention a great deal of trouble has been encountered in providing a suitable connecting link between the measuring element and the recording element in an instrument of this type because of the complicated nature of such links. At times during the operation of a recording instrument the pen may be held while the measuring element continues to move in accordance with the variations in the condition that is being measured, or the pen may be accidentally moved independently of the measuring element, thus setting up a strain, through the connecting link, on the element not being moved. In order to do away with any strain on either the recording or measuring element it has been customary to provide some type of over-load mechanism which, when an abnormal strain was placed on any of the parts, would give so that the strain would not be transmitted from the pen to the measuring element or vice versa.

In the present invention we have overcome the difficulties of the prior art by providing a small connecting link which consists of a single piece of wire provided in its central portion with a spring element that is wound under compression. With a connecting link of this type when any unusual strain or abnormal movement is imparted to either the recording or measuring elements the spring portion of the connecting link will give thereby preventing strain from being placed on the second member.

It is an object of our invention to provide a connecting link of this type which is easy to make and easy to install in a recording instrument. It is a further object of our invention to provide a connecting link of the above described type which will always return to its normal length upon the removal of any strain and thereby insure that the relative relation between the measuring and recording elements will be maintained.

The various features of novelty which characterize our invention are pointed out with particularity in the claims annexed to and forming a part of this specification. For a better understanding of the invention, however, its advantages and specific objects obtained with its use, reference should be had to the accompanying drawing and descriptive matter in which we have illustrated and described a preferred embodiment of the invention.

Figure 1:
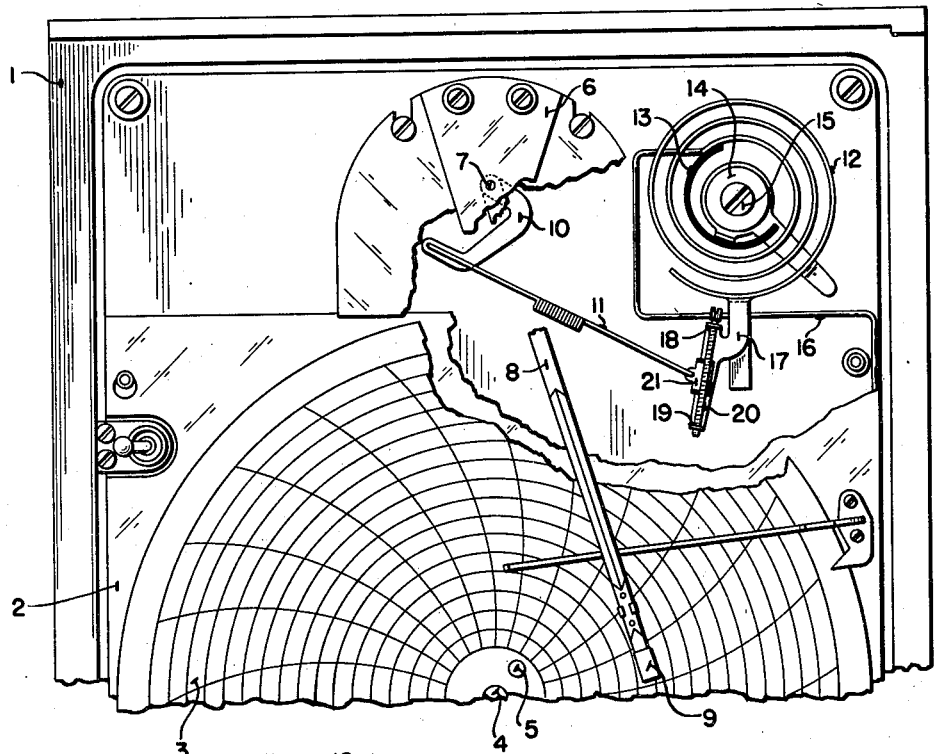
Fig. 1 is a front view of a recording instrument having certain parts broken away to show the relation of the connecting link to the other parts.

Referring to Fig. 1 there is shown an instrument casing 1 in which are mounted the various recording and measuring elements. This casing is provided with a chart backing plate 2 upon which is mounted chart 3 that is supported by a pin 4 and rotated by a driving pin 5. Mounted in suitable bearings one of which is shown at 6 in the upper part of the casing, is a shaft 7 to which is attached a suitable indicating arm such as the pen arm 8 having on its lower end a pen 9 that is adapted to make a record upon the chart as the chart rotates. This pen is moved back and forth across the chart in accordance with changes in a condition being measured by means of an arm 10 that is also attached to the shaft 7. This arm is connected through a novel link 11 to the measuring element that is responsive to the value of the condition being measured. As is shown herein the measuring element consists of the pressure responsive Bourdon tube 12 supported at its inner end upon a bimetallic element 13 which is in turn mounted on an adjustable support 14 that is attached to the casing 1 by means of a screw 15. While it is obvious that the pen can be used to record the value of any measurable condition it is shown herein by way of example only as recording the value of a temperature that is measured by means of a temperature responsive bulb (not shown) which is connected to the inner end of the Bourdon tube 12 by a capillary tube 16.

As the temperature to which the bulb is subjected increases the spiral will expand and move a bracket member 17 attached to its outer end in a counter-clockwise direction. If the temperature of the casing 1 should change the temperature of the spiral would also change and if this temperature change was in an upward direction the spiral would tend to move its outer end counter-clockwise. Since, however, the spiral is mounted on a bimetallic element 13 which is so arranged that it will move its outer end clockwise upon an increase in the case temperature it will bodily move the spiral clockwise with the result that the bracket 17 attached to the outer end of the spiral has, in effect, no movement. Therefore, movement of the bracket 17 is responsive only to changes to which the temperature bulb is subjected.

The bracket 17 is provided with wings 18 and 19 in which is mounted for rotation a screw member 20. Cooperating with the screw member is a U-shaped slider 21 to which the right end of the link 11 is connected. As the screw 20 is rotated the slider 21 will be moved radially with respect to the center of the spiral 12 and will, therefore, vary the distance that the slider will be moved for a given deflection of the spiral.

Figure 2:
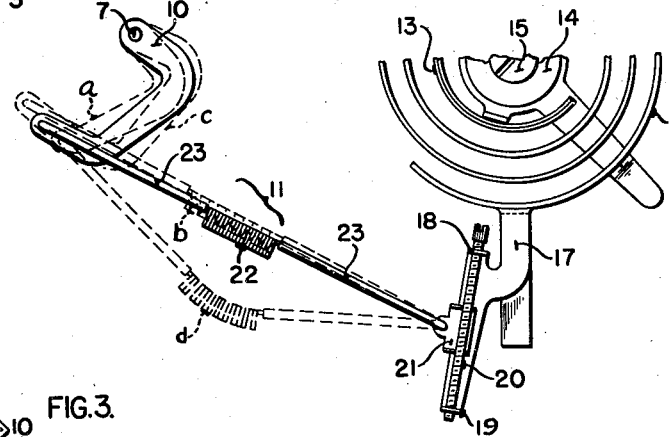
Fig. 2 is an enlarged view of the connecting link.
Figure 3:
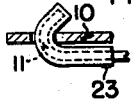
Fig. 3 is an enlarged detail view of one end of the link.

As is shown more clearly in Fig. 2 the connecting link 11 is formed from a continuous piece of wire that is wound with a spring portion 22 midway between its ends. The spring portion 22 is wound under initial compression, or in such a manner that it has a normal minimum length and will return to that length when any distorting force, that may have been applied thereto, is removed. The wire of the link on each end of the spring portion and extending to the points at which its ends connect respectively with the arm 10 and the slider 21 is surrounded by sleeves 23 that serve to stiffen and prevent buckling of the connecting wire between the spring portion 22 and the ends thereof. Each end of the link is bent over and passed through an opening in either slider 21 or arm 10, as shown in Fig. 3. The bent end of the link is so shaped that it touches both sides of the opening through which it extends so that there will be no play between the link and the members to which it is attached.

In the operation of the recorder it may be assumed that the pen is accidentally moved to such an extent that the spiral would be put under strain if some connection was not provided between the two that would absorb such movement of the pen. Assume, for example, that the end of the spiral supporting the bracket 17 remains stationary while the pen is moved clockwise. In this case the arm 10 would be moved to its dotted position a and the spring portion 22 of the connecting link 11 will be stretched as shown at b. When the pen is released the spring section 22 will return to its normal length to put the pen in its proper relation with respect to the spiral. If, however, the pen arm had been moved counter-clockwise the lever 10 would have moved to position c that brings its outer end nearer to the spiral. In this case the spring section of the link 11 will bend as shown at d permitting the movement of the pen without any strain being imparted to the spiral. Upon releasing the pen arm the spring section 22 will return to its normal shape and will thereby return the pen to its proper position relative to the bracket 17.

The particular construction shown and disclosed above is of great importance in the recording instrument art since it relates to an overload connection that may be inserted between the measuring and recording elements of a recording instrument, which connection consists of an absolute minimum of parts and one that may be easily changed if necessary.

While in accordance with the provisions of the statutes, we have illustrated and described the best form of our invention now known to us, it will be apparent to those skilled in the art that changes may be made in the form of the apparatus disclosed without departing from the spirit of our invention as set forth in the appended claims, and that in some cases certain features of our invention may sometimes be used to advantage without a corresponding use of other features.

Having now described our invention, what we claim as new and desire to secure by Letters Patent is:

1. In a recording instrument having a measuring element and an exhibiting element, a member to connect the two elements for positive movement of one by the other in opposite directions, but permitting relative movement therebetween, comprising a link formed of a spring, the ends of the spring extending in a plane parallel to the axis of the spring and tubular reinforcing members on the said ends to prevent deformation thereof.

2. In a measuring instrument, a connecting member adapted to hold two elements a normal distance apart but which may give to permit said elements to come closer together or move further apart than normal comprising a length of wire formed with a coil spring between its ends, said ends being reinforced by strengthening members attached thereto and maintained in place by bending the tips of said ends.

3. In a recording instrument having measuring and exhibiting means, a link to connect the measuring and exhibiting means comprising a single length of wire formed with a coiled section formed as a spring wound under compression between two straight portions of wire, said straight portions being surrounded with tubular reinforcing members, the tip of each straight portion away from the spring section being bent to hook shape, the straight portions, bent tips and a line on the surface of the coiled section joining the straight portions lying in the same plane, which plane is parallel to the axis of the coiled section.

4. In combination, a driving member, a driven member and a link to transmit movement from said driving member to said driven member, said link consisting of a continuous length of spring wire having a coiled section forming a spring wound under compression intermediate a pair of straight portions that are formed with connecting portions at their ends away from the coiled section, said straight portions and an edge of said coiled section lying in a plane parallel to the axis of said coiled section.

5. In combination, a driving member, a driven member, and a link connecting said members to each other, said link comprising a single length of wire formed as a coiled spring section wound under compression between two straight portions of wire, each portion being formed with a hook on its end away from the spring section, each of said hooks engaging one member, the hooks, straight portions and outside edge of the coiled spring section adjacent where the straight portions start all lying in a plane parallel to the axis of the spring section, whereby upon the occurrence of an abnormal force moving said members toward each other the spring section will bend outwardly away from said plane.

ROY ULLMAN.
COLEMAN B. MOORE.